United States Patent [19]

Ayers et al.

[11] Patent Number: 4,931,368
[45] Date of Patent: Jun. 5, 1990

[54] VENT LINER & COVER CONSTRUCTION FOR GALVANIC CELLS

[75] Inventors: Alan D. Ayers, Brunswick; John A. Wesner, Avon Lake, both of Ohio

[73] Assignee: Eveready Battery Company, St. Louis, Mo.

[21] Appl. No.: 102,814

[22] Filed: Sep. 22, 1987

Related U.S. Application Data

[63] Continuation of Ser. No. 886,619, Jul. 18, 1986, abandoned.

[51] Int. Cl.$^5$ .............................................. H01M 2/12
[52] U.S. Cl. ........................................ 429/53; 429/56; 429/82; 429/66
[58] Field of Search ............... 429/53, 56, 82, 89, 429/66; 220/89 A; 411/517, 519, 520, 521

[56] References Cited

U.S. PATENT DOCUMENTS

| | | | |
|---|---|---|---|
| 2,266,049 | 12/1941 | Kost | 411/520 |
| 2,321,157 | 6/1943 | Rees | 411/521 |
| 2,321,158 | 6/1943 | Rees | 411/521 |
| 2,712,262 | 7/1955 | Knohl | 411/521 |
| 3,484,301 | 12/1969 | Gray | 429/54 |
| 3,485,673 | 12/1969 | Jost | 429/54 |
| 4,227,701 | 10/1980 | Tsuchida et al. | 429/56 |
| 4,237,203 | 12/1980 | Tsuchida et al. | 429/56 |
| 4,328,289 | 5/1982 | Zupancic et al. | 429/56 |
| 4,329,405 | 5/1982 | Zupancic | 429/56 |
| 4,338,382 | 7/1982 | Fritts | 429/89 |
| 4,397,919 | 8/1983 | Ballard | 429/53 |
| 4,437,231 | 3/1984 | Zupancic | 429/53 |
| 4,483,908 | 11/1984 | Zimmerman | 429/53 |
| 4,529,673 | 7/1985 | Zupancic | 429/56 |
| 4,592,970 | 6/1986 | Zupancic | 429/56 |

FOREIGN PATENT DOCUMENTS

| | | |
|---|---|---|
| 555705 | 9/1922 | France . |
| 1579532 | 3/1968 | France . |
| 0627059 | 7/1949 | United Kingdom ............. 411/519 |

*Primary Examiner*—John F. Niebling
*Assistant Examiner*—Steven P. Marquis
*Attorney, Agent, or Firm*—Virgil B. Hill

[57] ABSTRACT

An electrochemical cell having a cell housing that contains the active components of the cell; the cell housing having a vent liner containment section that comprises a sealing well having a bottom disposed toward the interior of the cell, an orifice in the sealing well and a support ledge at the bottom of the sealing well; a vent liner having a vent liner orifice disposed within the sealing well so that an end of the vent liner abuts the support ledge, the orifice in the sealing well and the vent liner orifice providing a path from the interior of the cell to the atmosphere; and a seal member force-fitted within the vent liner, wherein the vent liner and the seal member are adapted so that the seal member will be at least partially expelled from the vent orifice at a predetermined internal gas pressure within the cell.

19 Claims, 2 Drawing Sheets

VENT LINER & COVER CONSTRUCTION FOR GALVANIC CELLS

This is a continuation of application Ser. No. 886,619, filed July 18, 1986, now abandoned.

BACKGROUND OF THE INVENTION

This invention relates to a safe, non-resealable vent closure for galvanic cells, such as nonaqueous liquid oxyhalide cells, and more particularly to an improved vent liner and cell cover for such cells.

Reliable, long service life cells or batteries have been developed for portable electrically powered devices such as tape recorders, playback machines, radio transmitters and receivers. Electrochemical cell systems for such devices provide a long service life by utilizing highly reactive anode materials such as lithium, sodium and the like, in conjunction with high energy density nonaqueous liquid cathode materials and suitable salts, often referred to as cathode-electrolytes.

Galvanic cells typically are sealed to prevent loss of electrolyte by leakage. This is especially important in the case of nonaqueous liquid cathode cells, which typically employ highly reactive oxyhalide or halide cathode-electrolytes. Any escape of such liquids, or their reaction products, could cause damage to the device employing the cell, or to the surface of a compartment or shelf where the cell is stored.

On the other hand, certain operating conditions can cause the internal pressure of such liquid cathode cells to markedly increase. This pressure can be caused by external sources, such as fire, or internal sources, such as heat generated during charging. In certain situations, the anode can melt and react directly with the liquid cathode in a vigorous, energy-releasing reaction. In the case of other galvanic cells, such as alkaline-zinc cells, carbon-zinc cells, etc., such cells may generate large quantities of gas under certain conditions of use. Thus, if any of the foregoing cells were permanently sealed, the build up of internal pressure within the cell could cause the cell container to leak, bulge or even rupture, which can cause property and/or bodily damage.

It is therefore necessary to provide a vent for galvanic cells that is designed to remain sealed during normal operating conditions which the cell may encounter, but which will open when the pressure within the cell substantially increases. In the case of liquid cathode cells employing, for example, a lithium anode, the vent must open before the lithium melts and reacts directly with the liquid cathode. Upon venting, most of the liquid cathode material is removed and is thus unavailable for reaction with the anode.

One type of vent assembly previously used for lithium-oxyhalide cells comprises a vent liner of a material such as polytetrafluoroethylene inserted into an orifice in a cell cover, with a seal member such as a glass ball forced into the orifice of the liner to seal the cell. Upon build up of a predetermined pressure within the cell, the seal member will be at least partially expelled from the liner orifice, thereby forming a permanent vent to the atmosphere. In manufacturing such a vent assembly, an orifice typically is formed by punching a hole in the cell cover. Thereafter, the liner is inserted in the cell cover orifice. Preferably, the liner is flanged on its upper edge so that it will be accurately positioned upon insertion into the cell cover orifice. After insertion, the flange abuts the upper surface of the cover, and a portion of the liner may extend beyond the bottom surface of the cover into the cell interior. Since the punching operation leaves a rough edge at the intersection of the walls of the orifice and the top of the cover, which could detrimentally score the liner, the liner is not forced or press-fitted into the cell cover orifice to provide a tight fit.

Punching out the hole in the cell cover to create an orifice into which the vent liner is inserted results in the orifice being outwardly tapered toward the bottom of the cell cover. As a result, a crevasse will exist between the cell cover and the vent liner. This crevasse will fill with cathode electrolyte fluid when the cell is filled. In consequence, an undesirable electrochemical cell system is created between the lithium in the cell, and oxygen or water vapor, or both, present in the atmosphere directly outside the cell cover. The lithium is oxidized according to:

$$Li \rightarrow Li^{30} + e^{31}$$ 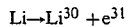

The lithium ions will diffuse out of the cell through the electrolyte contained in the crevasse and at the vent liner/cover interface, whereupon atmospheric water and oxygen are reduced according to:

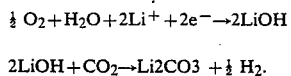

$$\tfrac{1}{2} O_2 + H_2O + 2Li^+ + 2e^- \rightarrow 2LiOH$$

$$2LiOH + CO_2 \rightarrow Li_2CO_3 + \tfrac{1}{2} H_2.$$

One or more of these products, which are formed on the exterior of the cell cover, can be extremely corrosive, and in combination with the driving potential of the undesirable electrochemical cell system, could cause leakage of the cell to accelerate with time and could also cause short-circuiting of the cell.

SUMMARY OF THE INVENTION

This invention employs a novel cell construction comprising a cell container which has a vent liner containment section that includes a sealing well having a bottom disposed toward the interior of the cell, an orifice in the sealing well and a support ledge at the bottom of the sealing well. A vent liner having a vent liner orifice is disposed within the sealing well so that an end of the vent liner abuts the support ledge, so as to provide a path from the interior of the cell to the atmosphere via the sealing well orifice and the vent liner orifice. A seal member is force-fitted within the vent liner, and the vent liner and the seal member are adapted so that the seal member will be at least partially expelled from the vent orifice at a predetermined gas pressure within the cell.

During manufacture, the support ledge provides a positive stop against which the vent liner cannot be further inserted, thereby eliminating the need for a flange at the top of the vent liner. In addition, if the sealing well has a relatively smooth wall, as is produced by forming the sealing well from a smooth sheet of material by metal forming methods, then creation of intimate contact between the vent liner and the sealing well results in the elimination of a crevasse between the cell cover and the vent liner, thereby effectively eliminating the path for diffusion of lithium ions to the outside of the cell. A sealant can be disposed at the interface of the sealing well and the vent liner to fill any surface imperfections at these interfacial surfaces. Certain other novel structural features and manufacturing techniques can be advantageously employed in connection with this invention, as is explained more fully below.

BRIEF DESCRIPTION OF THE DRAWING

FIGS. 4A, 4B and 4D respectively are top, side and perspective views of a type of anode spring collector usable in a cell made in accordance with the present invention. FIG. 4C is a perspective view of the material stock used to form the spring collector shown in FIGS. 4A, 4B and 4D.

FIGS. 5A–5F are side views of the cell cover during stages of its manufacture.

DESCRIPTION OF THE PREFERRED EMBODIMENTS

Figure 1:
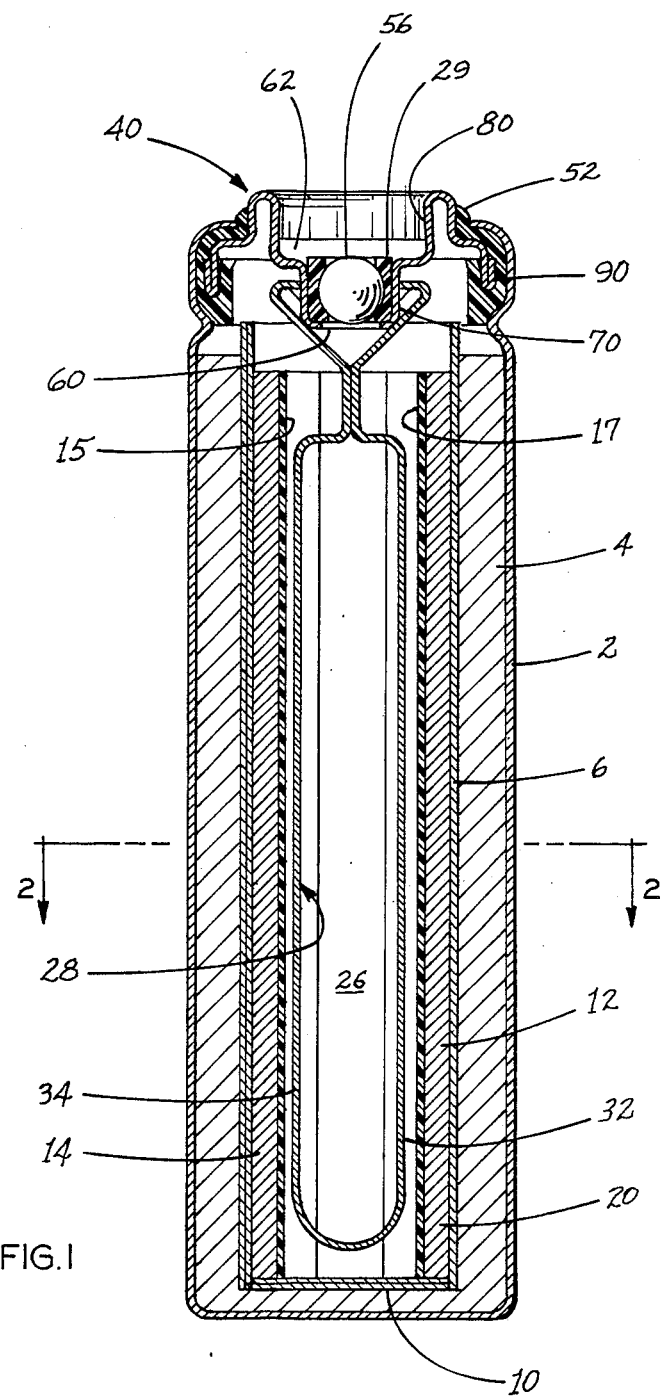
FIG. 1 is a vertical cross sectional view of an electrochemical cell made in accordance with the present invention.

Referring in detail to FIG. 1, there is shown a cross-sectional view of a cylindrical cell. The cell depicted is a nonaqueous electrochemical cell comprising an anode, a cathode collector and a liquid cathode-electrolyte.

The cathode-electrolyte comprises a solution of an ionically conductive solute dissolved in an active cathode depolarizer. The cathode depolarizer can be a liquid oxyhalide of an element of Group V or Group VI of the Periodic Table, such as sulfuryl chloride, thionyl chloride, phosphorus oxychloride, thionyl bromide, chromyl chloride, vanadyl tribromide and selenium oxychloride. Also usable as a cathode depolarizer is a halide of an element of Group IV to Group VI of the Periodic Table, such as sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, tin bromide trichloride, tin dibromide dichloride and tin tribromide chloride.

The solute for use in the cathode electrolyte can be a simple or double salt which will produce an ionically conductive solution. Preferred solutes for nonaqueous systems are complexes of inorganic or organic Lewis acids and inorganic ionizable salts. Typical Lewis acids suitable for use in conjunction with liquid oxyhalide cathode depolarizers include aluminum fluoride, aluminum bromide, aluminum chloride, antimony pentachloride, zirconium tetrachloride, phosphorous pentachloride, boron fluoride, boron chloride and boron bromide. Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

If desired, and specifically for the halides, a cosolvent can be added to the cathode-electrolyte to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, qamma-butyrolactone, sulfolane, ethylene qlycol sulfite, dimethyl sulfite, benzoyl chloride, dimethoxyethane, dimethyl isoxazole, diethyl carbonate, sulfur dioxide and the like.

The cell housing of FIG. 1 comprises a cylindrical cell container 2 having an open end that is closed by a cell cover 40. A cathode collector shell 4 is in contact with the inner upstanding circumference of the cell container 2, thereby adapting the container 2 as the cathodic or positive terminal for the cell. Exposed within and in contact with the inner circumference of cathode collector 4 is a separator liner 6 with a bottom separator or disk 10. If desired, the cathode collector material could be extruded within the container 2, rolled with the container material or composed of one or more segments to form a cylindrical tube thereafter placed in the container.

Figure 2:
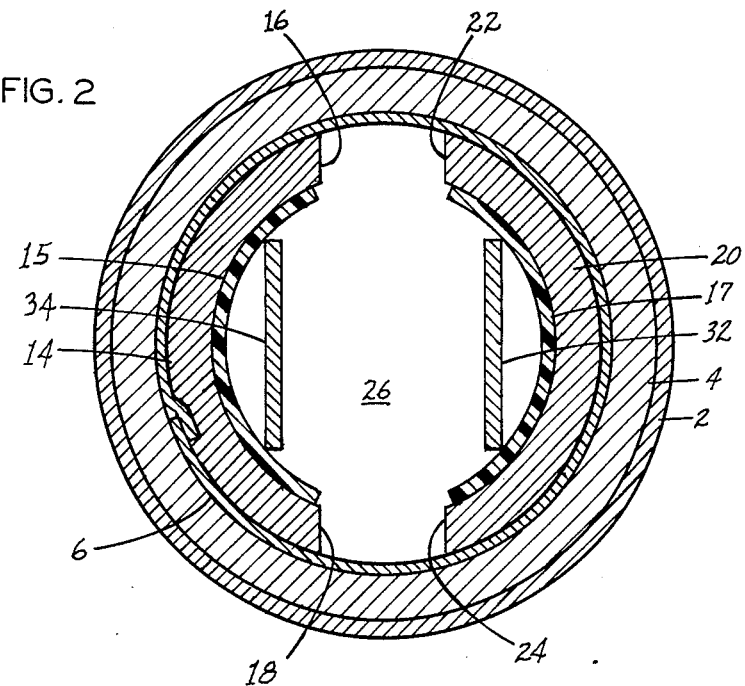
FIG. 2 is a horizontal cross-sectional view taken along line 2—2 of FIG. 1.

A two-member anode 12 shown in FIGS. 1 and 2 comprises a first half cylindrical annular member 14 having flat end faces 16 and 18 and a second half cylindrical annular member 20 having flat end faces 22 and 24. When the flat end faces of each cylindrical half member are arranged in an opposing fashion, as shown in FIGS. 1 and 2, an axial cavity 26 is defined between the cylindrical half annular members 14 and 20.

Cathode collector shell 4 has to be electronically conductive so as to permit external electrical contact to be made with the active cathode material and also to provide extended area reaction sites for the cathodic electrochemical processes of the cell. Materials suitable for use for cathode collector shell 4 are carbon materials and metals such as nickel, with acetylene black being preferable. In addition, cathode collector shell 4, if made of a particulate material, should be capable of being molded directly within container 2 or capable of being molded into variously sized discrete bodies that can be handled without cracking or breaking. If cathode collector shell 4 is fabricated from a carbonaceous material, a suitable binder, with or without stabilizers, can be added to the cathode collector materials. Suitable binders for this purpose are vinyl polymers, polyethylene, polypropylene, polyacrylics, polystyrene and the like. For example, polytetrafluoroethylene would be the preferred binder for cathode collector shell 4 if the cell shown in FIG. 1 were used with a liquid oxyhalide cathode. The binder, if required, should be added in an amount between about 5% and about 30% by weight of the molded cathode collector shell 4, since an amount less than 5% would not provide sufficient strength to the molded body, while an amount larger than 30% would wetproof the surface of the carbon and/or reduce the available surface of the carbon, thereby reducing the activation site areas available for the cathodic electrochemical process of the cell. Preferably, the binder should be between 10% and 25% by weight of the cathode collector shell 4. It is important that the materials selected for cathode collector shell 4 be chemically stable in the cell in which they are to be used.

Anode 12 is a consumable metal and can be an alkali metal, an alkaline earth metal, or an alloy of alkali metals or alkaline earth metals with each other and other metals ("alloy" as used herein includes mixtures, solid solutions such as lithium-magnesium, and intermetallic compounds such as lithium monoaluminide). The preferred materials for anode 12 are the alkali metals, particularly lithium, sodium and potassium. For the cell shown in FIG. 1, it is particularly preferred to make anode 12 of lithium, in conjunction with a liquid cathode of sulfuryl chloride, thionyl chloride, or mixtures thereof.

If desired, arcuate type backing sheets 15 and 17 can be disposed against the inner surface wall of the anode bodies 14 and 20, respectively, to provide uniform current distribution over the anode. This will result in a substantially uniform consumption or utilization of the anode, while also providing a substantially uniform spring pressure over the inner wall surface of anode 12.

Figure 3:
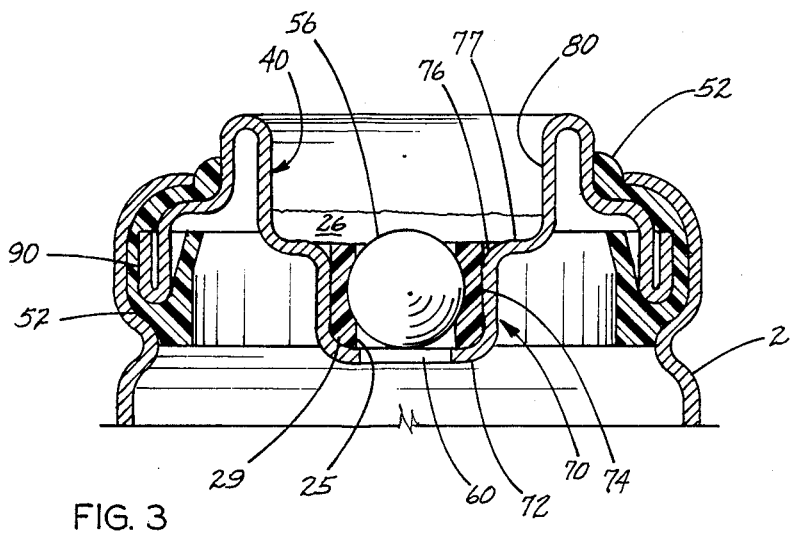
FIG. 3 is an enlarged vertical cross sectional view of the cell cover and the cell container of the electrochemical cell shown in FIG. 1, which shows in detail the cell cover and the vent liner of the cell.

Referring to FIGS. 1 and 3, cylindrical cover 40 comprises a circular cover orifice 60, vent liner containment section 70, annular cap section 80 and circumferential cover flange 90. Vent liner containment section 70 comprises circumferential support ledge 72, cylindrical sealing well 74 and rounded containment section shoulder 76. Circumferential support ledge 72, which is integrally joined to sealing well 74 at the bottom of sealing well 74, is inwardly directed throughout its circumference toward the geometric axis of sealing well 74, thereby defining cover orifice 60. Rounded containment section shoulder 76 is located at the intersection of the top of sealing well 74 and cover ledge 77, the latter being the horizontal surface spanning the area between shoulder 76 and cap section 80. Rounded containment section shoulder 76 provides a smooth transition at that intersection without sharp edges. The cover is tightly sealed by conventional closing methods to container 2 with insulating gasket 52 therebetween.

It is preferred that cover 40 be formed by drawing a section of sheet metal, preferably a sheet of stainless steel. The cover orifice 60 can be formed in cover 40 by conventional punching or drilling. The specific steps taken to fabricate cover 40 are discussed in greater detail below.

Cylindrical vent liner 29, which has a vent liner orifice 25 connecting its two circular ends, is positioned in cover 40 so that one of its ends abuts support ledge 72 and its cylindrical surface is in contact with the inner surface of sealing well 74. While it is preferred for support ledge 72 to be continuous about the circumference of sealing well 74 so as to minimize the potential for an undesired electrochemical cell system arising between the inside of the cell and atmospheric constituents, support ledge 72 can also comprise one or more inwardly projecting tabs or segments sufficient to provide a ledge against which vent liner 29 can abut.

Because the metal forming procedures that can be used to fabricate cover 40 leave the inner surface of sealing well 74 relatively smooth, intimate contact between vent liner 29 and sealing well 74, which is produced as described below, will substantially prevent the transport of any lithium ions from inside the cell to the outside of the cell cover. In this way, the undesired electrochemical cell system previously developed at the interface between the vent liner and the cover no longer arises, and corrosion of the cell via such a mechanism is prevented.

Vent liner 29 can be formed from (1) a sheet material molded to shape during the process of force-fitting a seal member into the orifice of vent liner 29; or (2) a tube fabricated to a suitable length, the latter being preferred. The material from which vent liner 29 is made can be resilient or non-resilient, but must be both resistant to attack by the electrolyte and not react with a seal member force-fitted therein so as to substantially alter the pressure at which the force-fitted seal member is ejected from the vent liner 29. It is presently preferred that vent liner 29 be a molded vent liner of Tefzel ®, available from E.I. Du Pont de Nemours & Co., Wilmington, Del., although other materials are suitable, such as polyethylene, polytetrafluoroethylene, perfluoroalkoxy polymer, fluorinated ethylene-propylene polymer, glasses, etc.

As stated above, a seal member is force-fitted into vent liner orifice 25 to seal the cell. This seal member preferably has a smooth spherical configuration, as exemplified by ball 56 in FIGS. 1 and 3. Ball 56 can be made of a resilient or non-resilient material such as metal, glass, ceramic, or plastics, and is made of a material or coated with a material that is chemically resistant to the cell s components, particularly the cell's liquid components. If ball 56 is resilient, it can be made from polytetrafluoroethylene, fluorinated ethylene-propylene copolymer, perfluoroalkoxy polymer, ethylene-tetrafluoroethylene copolymer or other selected fluoropolymers. When ball 56 is to be coated with a chemically inert material, it can then be made of any material.

It is preferred that the outer periphery of cover 40 be bent through an obtuse angle, preferably through one approaching or equal to 180 degrees, to provide cover flange 90, as shown in FIGS. 1 and 3. Such a construction, also called a "roll-back" construction, provides a tight seal between cover 40 and cell container 2, since flange 90 upon assembly is compressed against gasket 52, which causes flange 90 to "follow" gasket 52 if any dimensional changes to the cell occur from thermal expansion and/or contraction.

An electrically conductive spring strip 28, whose legs 32 and 34 are biased against the two screen-backed anode members 14 and 20, is electrically connected to cell cover 40 so as to make cover 40 the anodic or negative terminal of the cell. The ends of spring legs 32 and 34 can be electrically connected to cover 40 by welding the ends to cover 40. Alternatively, the geometric configuration of cell cover 40 when made in accordance with this invention allows use of a novel connection system. Referring to FIGS. 4A through 4D, there is shown a unitary spring collector assembly 420, comprising spring strip 28 and an annular fastening disk 401. Disk 401 is made of a resilient material, such as stainless steel. The spring legs 32 and 34 of spring strip 28 are joined, as by welding, in region 402. Disk 401 contains a castellated fastening hole 403, having four downwardly bent, radially and inwardly directed tabs 406 spaced at equal intervals about the circumference of hole 403 so as to define four radially directed slits 404. The diameter of hole 403 is smaller than the outside diameter of the cylindrical exterior surface of sealing well 74 that is disposed inside the cell. Thus, when disk 401 is forced axially onto the exterior surface of sealing well 74, the tabs in disk 401 will be forced to deflect slightly open. The deformed interference fit created by the spring tabs 406 of disk 401 thereafter firmly secures disk 401 to cover 40 in a tight compressive manner, thereby ensuring electrical connection of cover 40 with spring strip 28.

Collector assembly 420 is formed from a single piece of material, that is shown in FIG. 4C, with disk 401 being integrally joined to first forming member 465 and second forming member 466. Members 465 and 466 are appropriately bent and joined in region 402 to form the spring legs 32 and 34 of spring strip 28.

To fabricate the cell illustrated in FIGS. 1 through 3, cell cover 40 is drawn so as to have the shape shown in FIGS. 1 and 3. The fabrication sequence is illustrated by FIGS. 5A–5F. Specifically, a stainless steel strip, e.g., of 0.012 inch thick 304L stainless steel, having a smooth surface finish is subjected to a blanking operation, which cuts out a flat disc of a size sufficient so that cover 40 can be drawn from it. The disc is then drawn into a cup shape, as shown in FIG. 5A, and cover flange 90 is partially formed by reverse bending the periphery of the partially formed cover, as shown in FIG. 5B.

Vent liner containment section 60 and annular cap section 80 are next formed in the partially formed cover by a drawing operation. To prevent cracking during drawing, it is preferred that this drawing operation be performed in a number of steps, each successively drawing cover 40 closer to its final form. Subsequent to the step that yields the cover shape shown in FIG. 5B, nine steps are used to draw cover 40 to its final form. Specifically, after forming the cover shape shown in FIG. 5B, the cover is drawn to form a bowl section 503, as shown in FIG. 5C, from which vent liner containment section 70 will be formed. Five successive drawing steps are next performed to successively narrow the bowl section 503 and to yield the cover shape shown in FIG. 5D. The next drawing step starts to form annular cap section 80 and yields the cover shape shown in FIG. 5E. Two further drawing steps yield the final configuration of cover 80, as shown in FIG. 5F. Cover orifice 60 is then formed in a punching operation. Alternatively the containment section 70 may be formed first in the drawing operations.

The foregoing drawing operations will affect somewhat the smooth surface finish of the steel. However, the finish will remain sufficiently smooth such that subsequent insertion of vent liner 29 into sealing well 74 can be performed in a way that yields intimate contact between them, as is discussed below.

Cylindrical vent liner 29 preferably has an outside diameter slightly larger than the inside diameter of cylindrical sealing well 74 so that vent liner 29 can be press-fitted into sealing well 74 to yield an interference fit. In a present embodiment, a vent liner 29 having an outside diameter of 0.135 inch is press-fitted into a sealing well 74 having an inside diameter of 0.125 inch.

Vent liner 29 is inserted into sealing well 74 until the bottom of vent liner 29 abuts support ledge 72. In this way, support ledge 72 provides a positive stop against which vent liner 29 cannot be further inserted, thereby eliminating the need for any flange at the top of the vent liner. In addition, the interference fit causes the outer surface of vent liner 29 to be strongly forced against the inner surface of sealing well 74, which causes intimate contact between those two surfaces, thereby effectively preventing the transport of lithium ions from the inside to the outside of the cell via the interface between vent liner 29 and sealing well 74. Since containment section shoulder 76 is rounded, insertion of liner 29 is made easier, and the potential for scoring the liner during insertion is minimized. It is preferred that the length of vent liner 29 be such that, when inserted in sealing well 74, the upper circular end of vent liner 29 is flush with cover ledge 77.

It is also preferred for oxyhalide cells that sealing well 4 be coated with a sealant prior to insertion of liner 29. Such a sealant more completely ensures the sealing of liner 29 to sealing well 74 in the event of possible imperfections on the surface of liner 29 or sealing well 74. The sealant can be a halocarbon wax, which is a saturated low-molecular weight polymer of chlorotrifluoroethylene, or a fluoroelastomer. Alternatively, since Tefzel® is heat bondable, vent liner 29 when made of this material can be sufficiently heated prior to or after insertion into sealing well 74 and press bonded therein.

After insertion of vent liner 29 into sealing well 74, disk 401 of spring collector assembly 420 is pressed onto the cylindrical outside of sealing well 74 and cover 40 is inserted into its proper location inside annular gasket 52, which is located at the open end of cell container 2. It is preferred that gasket 52 be made of Tefzel® and coated with a sealant of the same type preferably used to coat sealing well 74. At the time cover 40 is inserted into annular gasket 52, container 2 has already been supplied with a cathode collector shell 4, a separator liner 6 and bottom separator 10, a two-member anode 12, and backing sheets 15 and 17. As cover 40 is positioned with respect to gasket 52, the legs 32, 34 of the spring strip 28 are squeezed together and forced into the axial opening between the two screen-backed anode members 14 and 20, as shown in FIGS. 1 and 2. The inserted spring strip 28 resiliently biases the two anode members 14 and 20 via backing screens 15 and 17 so as to provide substantially uniform and continuous pressure contact over the inner wall of the anode members.

After inserting cover 40 inside gasket 52, the cell is closed and sealed using conventional closing techniques, so that cell container 2 and cell cover 40 make up a sealed cell housing. A fill head assembly is next pressed against the top of vent liner 29. If the upper circular end of vent liner 29 is flush with cover ledge 77, as is preferred, then the fill head also presses against cover ledge 77. The cell is then filled with cathode-electrolyte.

After the container is filled with cathode-electrolyte, seal member 56 is disposed over vent liner orifice 25 in liner 29, and a ram member is used to force seal member 56 into orifice 25 until further insertion is resisted because of the presence of support ledge 72. In the prior construction, if the seal member were inserted too deeply in the vent liner, higher than desired vent pressures resulted, giving rise to the potential for cell disassembly under conditions of abuse. On the other hand, if the seal member were not inserted to a sufficient depth in the vent liner, then venting could occur during conditions of normal use, thereby causing unnecessary damage to the device using the cell. In the present invention, the placement of seal member 56 is less critical, and support ledge 72 provides a positive stop against which seal member 56 can be pressed, thereby providing easily reproducible vent pressures.

After removal of the ram, a layer of sealant 62 is disposed over seal member 56, vent liner 29 and extended onto cover ledge 77 to produce a fully sealed cell. Suitable sealing materials include halocarbon wax, asphalt, or any other material that is resistant to moisture, has reasonable adhesion to metal and is applied easily. Preferably, the sealant material should be applied in liquid form and then allowed to solidify. The cell is then finished, as by encasing it in a steel jacket and covering cap section 80 with a finishing cover (not shown).

A cell employing the present invention can be made smaller than can a cell using the prior construction. In the prior construction, the vent liner required a flange on its upper edge to prevent the vent liner from dropping into the interior of the cell. The seal member needed to clear this flange before venting could occur; in consequence, the height between the finishing cover and the upper surface of the cover had to be sufficient to accommodate both the diameter of the seal member and the thickness of the flange. In the present invention, however, since the upper circular end of vent liner 29 can be made flush with cover ledge 77, the height between the finishing cover and cover ledge 77 need only accommodate the diameter of seal member 56.

It is to be understood that the improved vent liner and cover construction of this invention could be used in connection with other cells such as, for example, Leclanche dry cells, zinc chloride cells, lithium-$MnO_2$ cells, lithium-iron sulfide cells, alkaline-$MnO_2$ cells, nickel-cadmium cells, and lead-acid cells.

We claim:

1. An electrochemical cell, comprising:
    (a) a cell housing that contains the active components of the cell said cell housing comprising a cell cover closing an opening in the cell housing a vent liner containment section being formed in a part of the cell cover, and the cell cover being formed from a unitary sheet of metallic material by a metal forming process to provide a sealing well;
    (b) said vent liner containment section formed in a part of the cell housing that comprises said sealing well which provides a positive stop against which a seal member can be pressed, having a bottom disposed toward the interior of the cell, and a support ledge at the bottom of the sealing well, said support ledge defining an orifice in said sealing well;
    (c) a vent liner, having a vent liner orifice, disposed within the sealing well so that an end of the vent liner abuts the support ledge, the orifice in the sealing well and the vent liner orifice providing a path from the interior of the cell to the atmosphere; and
    (d) a seal member force-fitted within the vent liner, wherein the vent liner and the seal member are adapted so that the member will be at least partially expelled from the vent liner orifice at a predetermined internal gas pressure within the cell.

2. The electrochemical cell as in claim 1, wherein the upper portion of the sealing well is contoured so as to define a contoured vent liner containment section shoulder that assists insertion of the vent liner into the sealing well.

3. The electrochemical cell as in claim 1, wherein there is an interference fit between the vent liner and the sealing well.

4. The electrochemical cell as in claim 1, wherein the outer periphery of the cell cover is bent through an obtuse angle to provide a flange at the periphery of the cell cover, and a gasket is disposed and compressed between the flange of the cell cover and the cell container, thereby providinq a substantially fluid-tight seal.

5. The electrochemical cell as in claim 1, wherein the sealing well is approximately cylindrical and the support ledge is continuous about the circumference of the sealing well.

6. The electrochemical cell as in claim 1, wherein the sealing well is approximately cylindrical and the support ledge comprises at least two radially inwardly directed tabs.

7. The electrochemical cell as in claim 1, wherein the sealing well has a cylindrical exterior surface disposed inside the cell and the cell further comprises:
    (a) a fastening member made of a resilient sheet of material that includes a fastening hole whose circumference is interrupted by a plurality of radially inwardly directed tabs, the fastening member being axially forced onto the cylindrical exterior surface of the sealing well; and
    (b) means fixed to the fastening member for electrically connecting one of the active components of the cell to the fastening member.

8. The electrochemical cell as in claim 7, wherein at least one of the active components of the cell is solid and the means for electrically connecting one of the active components of the cell to the fastening member is a spring strip fixed to the fastening member and biased so as to be in electrical contact with a solid active component of the cell.

9. An electrochemical cell, comprising:
    (a) a cell housing that contains the active components of the cell;
    (b) a cylindrical well formed in a part of the cell housing and having a cylindrical exterior surface disposed inside the cell a bottom disposed toward the interior of the cell and a support ledge at said bottom defining an orifice in said cylindrical well;
    (c) a vent liner, having a vent liner orifice;
    (d) a seal member force-fitted within the vent liner;
    (e) a fastening member made of a resilient sheet of material that includes a fastening hole whose circumference is interrupted by a plurality of radially inwardly directed tabs, the fastening member being axially forced onto the cylindrical exterior surface of the well; and
    (f) means fixed to the fastening member for electrically connecting one of the active components of the cell to the fastening member.

10. The electrochemical cell as in claim 9, wherein at least one of the active components of the cell is solid and the means for electrically connecting one of the active components of the cell to the fastening member is an electrically conductive spring strip fixed to the fastening member and biased so as to be in electrical contact with a solid active component of the cell.

11. An electrochemical cell, comprising:
    (a) a cell housing that contains the active components of the cell said cell housing comprising
        (i) a cell cover closing an opening in the cell housing, a vent liner containment section being formed in a part of the cell cover, and the cell cover being formed from a unitary sheet of metallic material by a metal forming process to provide a sealing well;
    (b) said vent liner containment section formed in a part of the cell housing, and which vent liner containment section comprises
        (i) said sealing well having a bottom disposed toward the interior of the cell, and
        (ii) a support ledge at the bottom of the sealing well, said support ledge defining an orifice in said sealing well;
    (c) a vent liner, having a vent liner orifice, disposed within the sealing well so that one end abuts the support ledge, the orifice in the sealing well and the vent liner orifice providing a path from the interior of the cell to the atmosphere; and
    (d) a seal member force-fitted within the vent liner orifice and supported against the support ledge substantially above the sealing well orifice, wherein the vent liner and the seal member are adapted so that the seal member will be partially expelled from the vent liner orifice at a predetermined pressure within the cell.

12. The electrochemical cell of claim 11, wherein the upper portion of the sealing well is contoured so as to define a contoured vent liner containment section shoulder that assists insertion of the vent liner into the sealing well.

13. The electrochemical cell of claim 11, wherein there is an interference fit between the vent liner and the sealing well.

14. The electrochemical cell of claim 11, wherein the outer periphery of the cell cover is bent through an obtuse angle to provide a flange at the periphery of the cell cover, and a gasket is disposed and compressed between the flange of the cell cover and the cell container, thereby providing a substantially fluid-tight seal.

15. The electrochemical cell of claim 11, wherein the sealing well is approximately cylindrical and the support ledge is continuous about the circumference of the sealing well.

16. The electrochemical cell of claim 11, wherein the sealing well is approximately cylindrical and the support ledge comprises at least two radially inwardly directed tabs.

17. The electrochemical cell of claim 11, wherein the sealing well has a cylindrical exterior surface disposed inside the cell and the cell further comprises:
   (a) a fastening member made of a resilient sheet of material that includes a fastening hole whose circumference is interrupted by a plurality of radially inwardly directed tabs, the fastening member being axially forced onto the cylindrical exterior surface of the sealing well; and
   (b) means fixed to the fastening member for electrically connecting one of the active components of the cell to the fastening member.

18. The electrochemical cell of claim 17, wherein at least one of the active components of the cell is solid and the means for electrically connecting one of the active components of the cell to the fastening member is a spring strip fixed to the fastening member and biased so as to be in electrical contact with a solid active component of the cell.

19. The electrochemical cell of claim 11, wherein the vent liner has a length such that when inserted in the sealing well the top of the vent liner is flush with the top of the sealing well.

* * * * *